No. 660,785. Patented Oct. 30, 1900.
A. B. BELLOWS.
APPARATUS FOR PURIFYING WATER.
(Application filed Jan. 26, 1900.)
(No Model.) 9 Sheets—Sheet 1.

FIG. I.

WITNESSES:
Herbert Bradley
F. E. Gaither

INVENTOR
Arthur B. Bellows
by Darwin S. Wolcott Att'y.

No. 660,785. Patented Oct. 30, 1900.
A. B. BELLOWS.
APPARATUS FOR PURIFYING WATER.
(Application filed Jan. 26, 1900.)
(No Model.) 9 Sheets—Sheet 3.

WITNESSES:
Herbert Bradley.
F. E. Gaither.

INVENTOR
Arthur B. Bellows
by Samuel S. Wolcott Att'y.

No. 660,785. Patented Oct. 30, 1900.
A. B. BELLOWS.
APPARATUS FOR PURIFYING WATER.
(Application filed Jan. 26, 1900.)
(No Model.) 9 Sheets—Sheet 4.

WITNESSES:
Herbert Bradley
F. E. Gaither

INVENTOR
Arthur B. Bellows
by Dennis B. Wolcott Att'y

No. 660,785. Patented Oct. 30, 1900.
A. B. BELLOWS.
APPARATUS FOR PURIFYING WATER.
(Application filed Jan. 26, 1900.)

(No Model.) 9 Sheets—Sheet 5.

WITNESSES: INVENTOR
Arthur B. Bellows
by Dennis B. Wolcott Att'y.

THE NORRIS PETERS CO., PHOTO-LITHO., WASHINGTON, D. C.

No. 660,785. Patented Oct. 30, 1900.
A. B. BELLOWS.
APPARATUS FOR PURIFYING WATER.
(Application filed Jan. 26, 1900.)
(No Model.) 9 Sheets—Sheet 7.

No. 660,785. Patented Oct. 30, 1900.
A. B. BELLOWS.
APPARATUS FOR PURIFYING WATER.
(Application filed Jan. 26, 1900.)

(No Model.) 9 Sheets—Sheet 8.

WITNESSES:
Herbert Bradley
F. E. Gaither

INVENTOR
Arthur B. Bellows
by Dennis S. Wolcott Att'y.

THE NORRIS PETERS CO., PHOTO-LITHO., WASHINGTON, D. C.

No. 660,785. Patented Oct. 30, 1900.
A. B. BELLOWS.
APPARATUS FOR PURIFYING WATER.
(Application filed Jan. 26, 1900.)
(No Model.) 9 Sheets—Sheet 9.

WITNESSES: INVENTOR

UNITED STATES PATENT OFFICE.

ARTHUR B. BELLOWS, OF PITTSBURG, PENNSYLVANIA, ASSIGNOR TO THE PITTSBURGH TESTING LABORATORY, LIMITED, OF SAME PLACE.

APPARATUS FOR PURIFYING WATER.

SPECIFICATION forming part of Letters Patent No. 660,785, dated October 30, 1900.

Application filed January 26, 1900. Serial No. 2,815. (No model.)

*To all whom it may concern:*

Be it known that I, ARTHUR B. BELLOWS, a citizen of the United States, residing at Pittsburg, in the county of Allegheny and State of Pennsylvania, have invented or discovered certain new and useful Improvements in Plants for Treating Liquids, of which improvements the following is a specification.

The invention described herein relates to certain improvements in plants for softening and filtering water, and has for its object an arrangement of connected tanks or receptacles whereby lime or other chemicals may be added to the inflowing water and after being thoroughly mixed therewith opportunity may be afforded for the gravity separation of the greater portion of the impurities, the completion of the separation being effected by means of a suitable filter.

In general terms, the invention consists in separating the inflowing water into two streams or bodies which shall have a certain quantitative relation to each other, adding to one or more of said bodies or streams the lime or other chemical in sufficient quantity to treat both bodies or streams, which are then thoroughly mixed and discharged into a settling tank or receptacle, where the impurities are separated more or less completely by gravity. The water is then passed through a filter, which effects a complete removal of all impurities.

In the accompanying drawings, forming a part of this specification.

Figure 7:
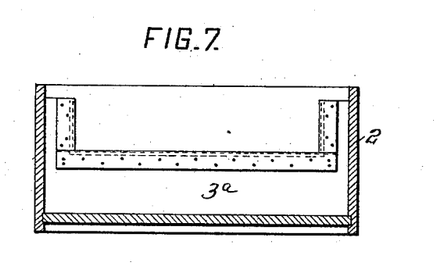
Figs. 7 and 8 are transverse sections, on an enlarged scale, of the dividing-trough, the planes of section being indicated, respectively, by the lines VII VII and VIII VIII, Fig. 1.
Figure 8:
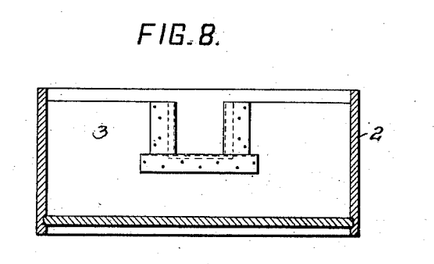

In the practice of my invention the supply-pipe 1 is connected to the dividing box or trough 2, preferably at a point midway of the length of the box or trough. Weirs 3 $3^a$ are arranged across the trough between the inlet and the discharge pipes 4 and 5. The notches in the upper edges of the weirs are so proportioned as to capacity that the streams of water flowing through said notches will have a certain relation to the other—as, for example, the notch of the weir 3 has one-fourth the capacity of that of the weir $3^a$, as shown in Figs. 7 and 8. In order that the division of the water may not be affected by the eddies and swirls produced by the inflowing stream, baffle-plates 6 are arranged across the box or trough between the inlet and the weir. These plates are so arranged that the water must pass under their lower edges as it flows to the weirs, the plates projecting above the surface of the water in the box or trough.

Figure 2:
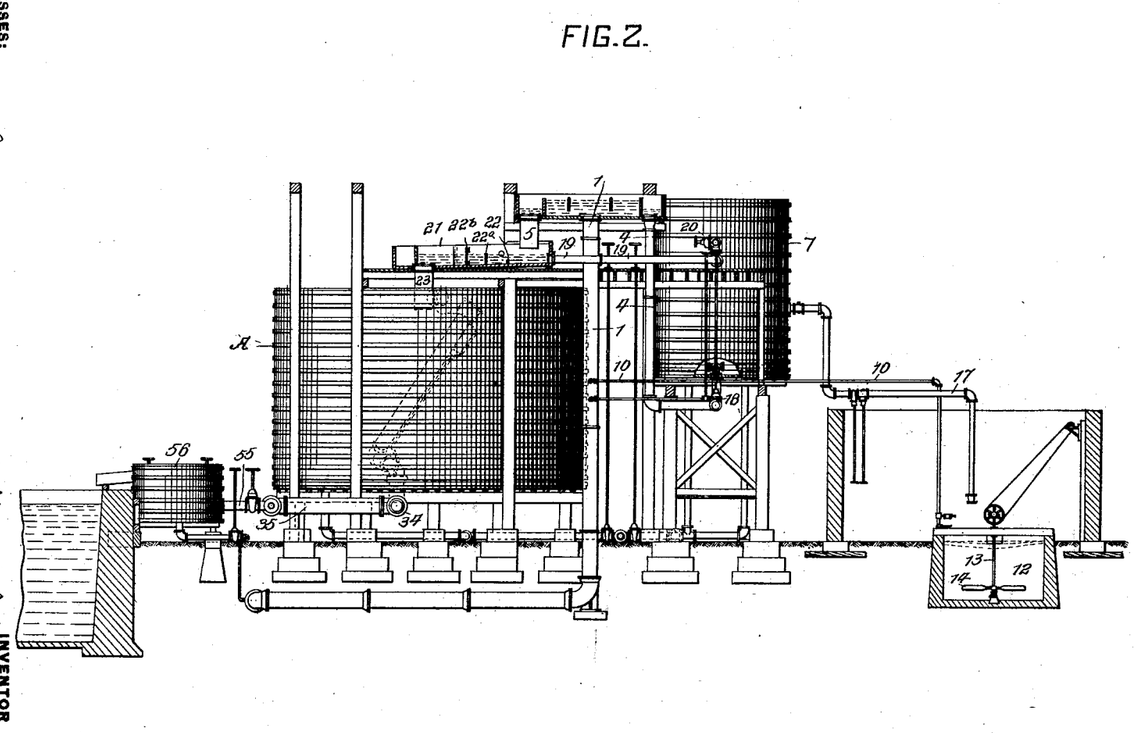
Fig. 2 is a sectional elevation of the same, the plane of section being indicated by the line II II, Fig. 1.
Figure 3:
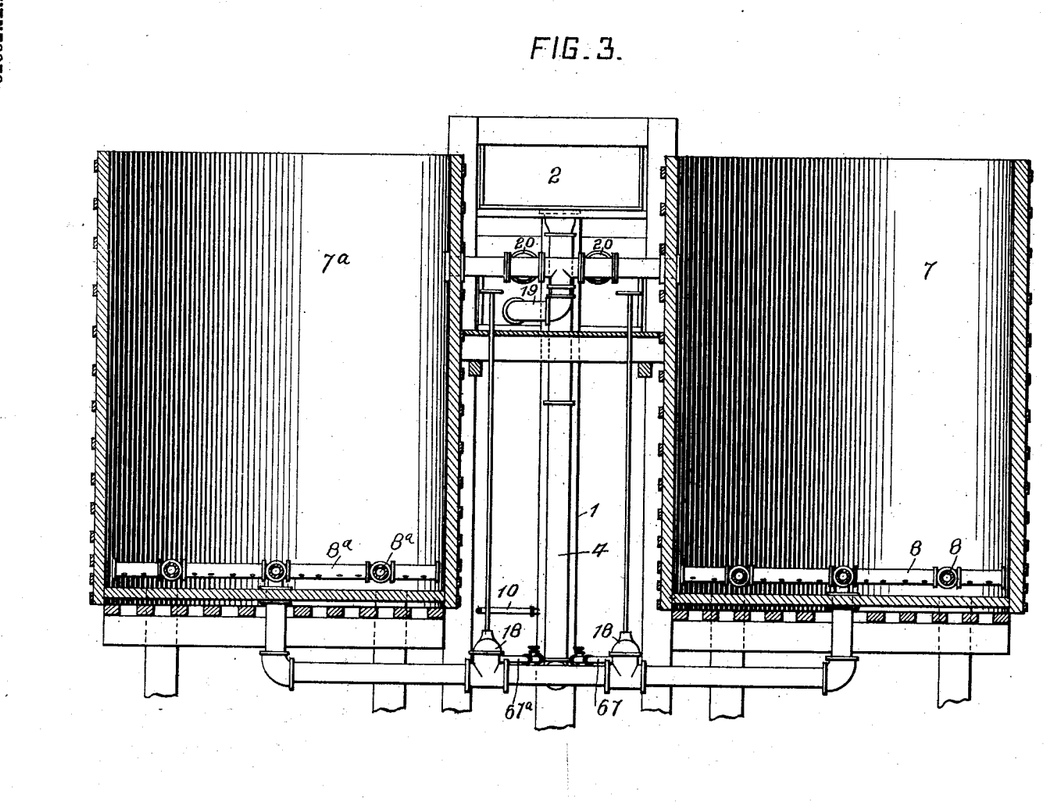
Fig. 3 is a sectional elevation of the take-up tanks, the plane of section being indicated by the line III III, Fig. 1.

The pipe 4 is provided with branches which extend up through the bottoms of tanks 7 and $7^a$, which for convenience will be termed the "take-up" tanks. Within the tanks the branches of the pipe 4 are provided with distributing-arms 8, raised slightly above the bottoms of the tank and perforated on their under sides, so that the water will be discharged downward from the arms, as shown in Figs. 2 and 3.

Before water from the pipe 4 is admitted into the take-up tanks they are partially filled with cream of lime. For the preparation of this cream, lime is placed in the mixing-box 9 and water in sufficient quantity is added thereto, the water being supplied by a pipe 10, extending from the supply-pipe 1. After the lime has been slaked the gate 11 is opened to allow the contents of the box to flow into the receptacle 12, into which projects the shaft 13, having the stirring-blades 14 secured thereto. The shaft 13 is rotated by the motor 15 through suitable shafts and belting, and the same means are preferably employed for operating the pump 16, by which the cream of lime is forced from the agitating receptacle or well 12 through the pipe 17 into one or the other of the take-up tanks 7 or 7<sup>a</sup>.

Figure 1:
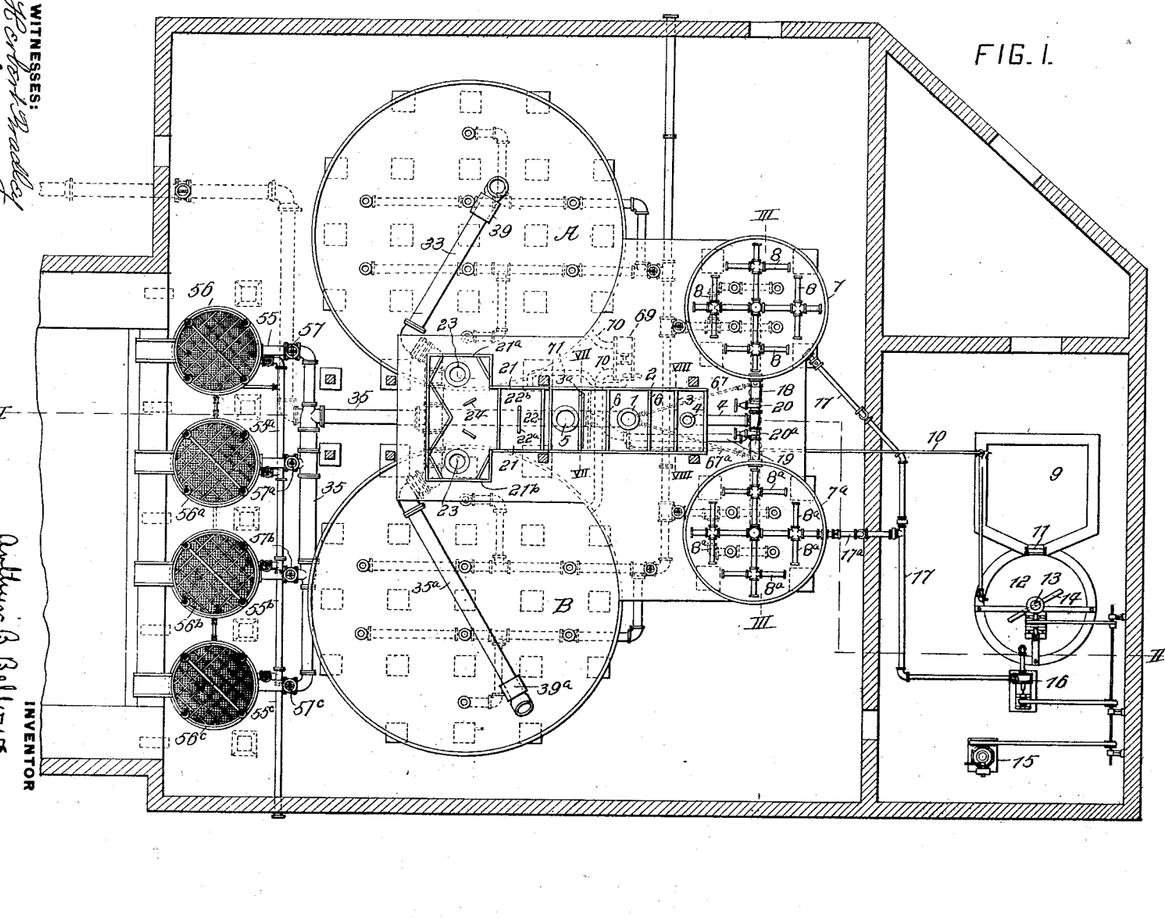
Figure 1 is a top plan view of my improved purifying and filtering plant.

As soon as a quantity of cream of lime at least sufficient to treat the quantity of water containable in one of the settling-tanks has been forced into one of the take-up tanks, as 7, the valve 18 in one of the branches of the pipe 4 is opened, permitting water to flow therefrom up through the cream of lime and out through one of the pipes 19. As shown in Fig. 1, this pipe, which has branches connecting, respectively, with the tanks 7 and 7<sup>a</sup>, is connected to the mixing and distributing trough 21. The branches of the pipe 19 are provided with valves 20 20<sup>a</sup>, controlling the flow of water from the tanks 7 7<sup>a</sup>.

As the water from the pipe 4 enters into the tanks 7 7<sup>a</sup> in small streams or jets, which are directed downward against the bottom of the tank, there will be only a slight agitation of the contents of the tanks, and such agitation as may be produced will be limited to the portions of the contents of the tanks closely adjacent to the bottom. Hence the water entering through the branches will quietly well up through the cream of lime and become saturated with lime.

Figure 4:
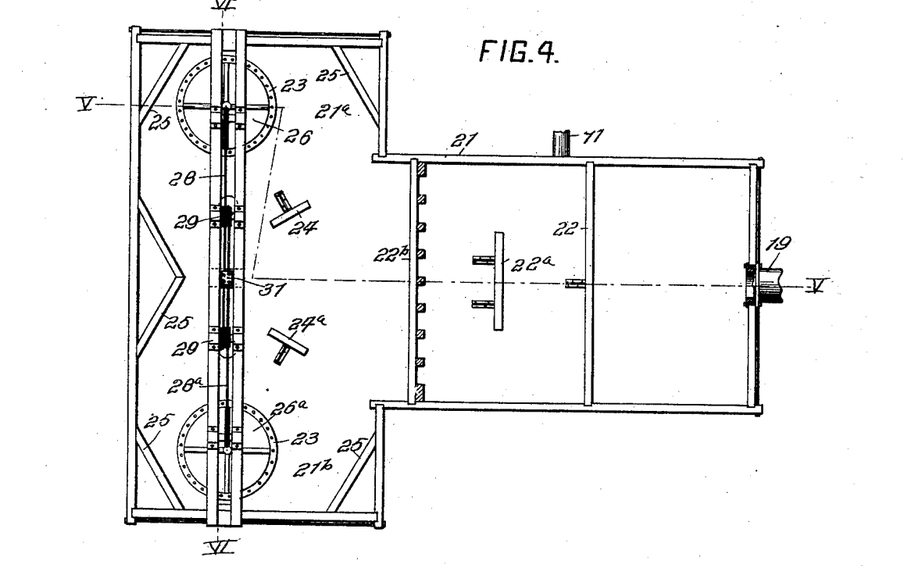
Fig. 4 is a plan view, on an enlarged scale, of the mixing and distributing trough.
Figure 5:
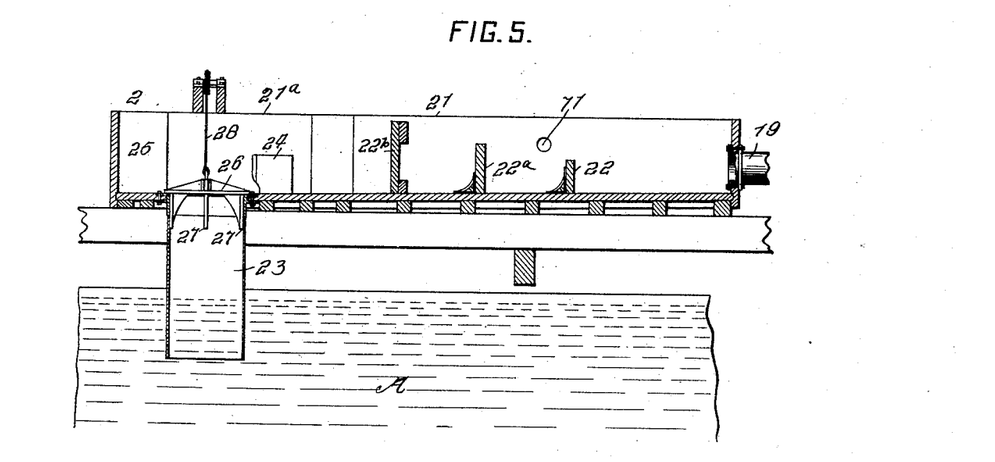
Figs. 5 and 6 are sectional elevations of the same, the planes of section being indicated, respectively, by the lines V V and VI VI, Fig. 4.

The lime-water flowing by the pipe 19 into the trough 21 meets the untreated stream of water flowing from the dividing-trough by the pipe 5. It is preferred that these two streams of water should flow together at or near one end of the trough, the directions or lines of flow in entering the trough being at such an angle to each other that the two streams will flow one into the other. In order to insure a thorough commingling of the two streams of water and to maintain an agitation thereof to hold the lime in suspension, a series of baffle-plates 22 22<sup>a</sup> 22<sup>b</sup>, &c., are arranged, as shown in Figs. 4 and 5, transversely of the trough, which is given a slight inclination downward from the end at which the water enters. While the baffle-plates may be arranged in any desired manner and any number may be employed, the arrangement shown gives excellent results. As shown in Figs. 4 and 5, the plate 22, the lower edge of which rests on the bottom of the trough, is made comparatively narrow and will therefore obstruct only the lower portions of the stream and impart an upward flow to such portions. The baffle-plate 22<sup>a</sup> is comparatively short and is arranged to divide the water flowing through the trough into two streams. The plate 22<sup>b</sup> is made in the form of a grating, consisting of narrow vertical bars secured to upper and lower bars arranged transversely of the trough.

The nozzles 23 23<sup>a</sup>, through which the water flows from the trough into the settling-tanks, are arranged in the pockets 21<sup>a</sup> and 21<sup>b</sup>, as shown in Figs. 3 and 5. If desired, supplemental baffle-plates 24 24<sup>a</sup> may be arranged in the paths of flow of the water toward the discharge-nozzles, and deflecting-plates 25 may be arranged around the nozzles, as shown in Fig. 4.

Figure 6:
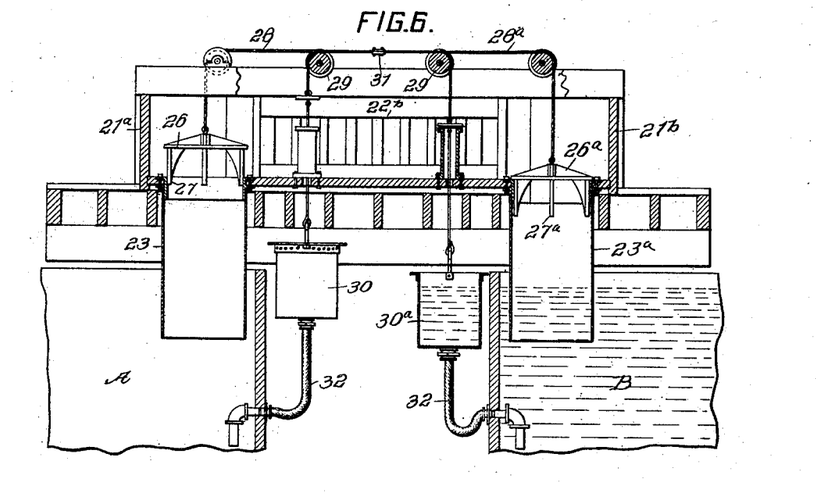

The flow of water through the nozzles 23 23<sup>a</sup> is controlled by disks or valves 26 26<sup>a</sup>, which are provided with guide-ribs 27 to insure the proper seating of the valves, as shown in Figs. 5 and 6. While these valves may be opened and closed by an attendant, it is preferred to shift them by means operating automatically, but controlled by the level of the water in the settling-tanks A and B. As shown in Figs. 4 and 6, the valves are connected to wire ropes or chains 28 28<sup>a</sup>, which pass in opposite directions over guide-pulleys 29 and have their opposite ends connected to buckets 30 and 30<sup>a</sup>. To insure the simultaneous movement of both valves, the ropes 28 28<sup>a</sup> are secured together by clamps 31. The lower ends of the buckets are connected to the tanks by hose 32 32<sup>a</sup> or other flexible means which will permit the buckets to rise and fall sufficiently to open and close the valves.

In describing the operation of the valve-shifting mechanism it will be supposed that the valve 26<sup>a</sup> is closed by the filling of bucket 30<sup>a</sup> and the valve 26 opened to permit the flow of water into the tank A. As the water rises in the tank A it will flow into the bucket 30 until the weight thereof is sufficient to overcome the weight of water overlying the valve 26<sup>a</sup>. As soon as the bucket 30 has filled sufficiently it will move down, raising the valve 26<sup>a</sup> and the bucket 30<sup>a</sup>, thereby permitting the valve 26 to drop to its seat. The water will now flow into the tank B until sufficient water flows into the bucket 30<sup>a</sup> to lift the valve 26 and bucket 30. It will be observed that the downward movement of one bucket not only raises the valve of one tank, but also sets the bucket connected to same tank into position to be shifted by water from said tank to open the other valve.

As separation of the impurities held in suspension in the water is effected by gravity in the tanks A and B, the water should be allowed to stand therein a sufficient length of time—say from ten (10) to twenty (20) minutes, more or less—to permit a settling of the impurities. As the settling is progressive from top to bottom, the drawing off of the water may begin as soon as the upper portion of the water is clear, provided the drawing off begins at the top and proceeds gradually downward as the settling proceeds.

While preferring to employ the means shown in the drawings and hereinafter more fully described for progressively drawing off the water, the broader claims are not limited to such means, as other means for that purpose will readily suggest themselves to the skilled mechanic.

Figure 9:
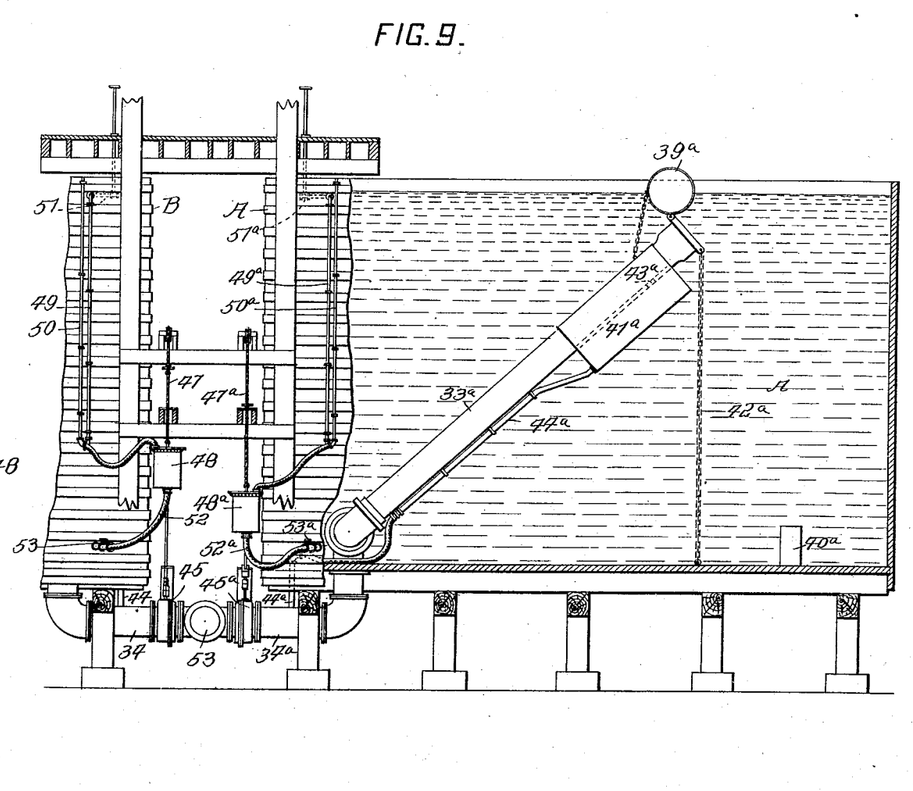
Fig. 9 is a view, partly in section and partly in elevation, showing the mechanism for automatically emptying the settling-tanks.
Figure 10:
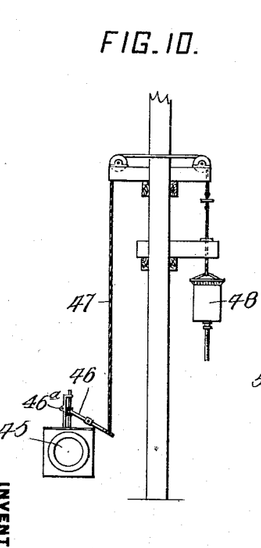
Fig. 10 is a detail view of a portion of the mechanism shown in Fig. 8.
Figure 10A:
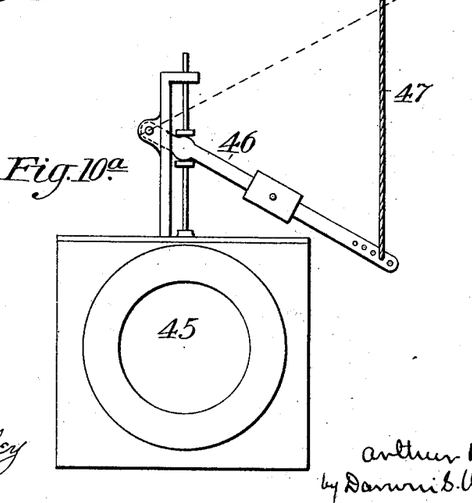
Figures 11, 12, 13:
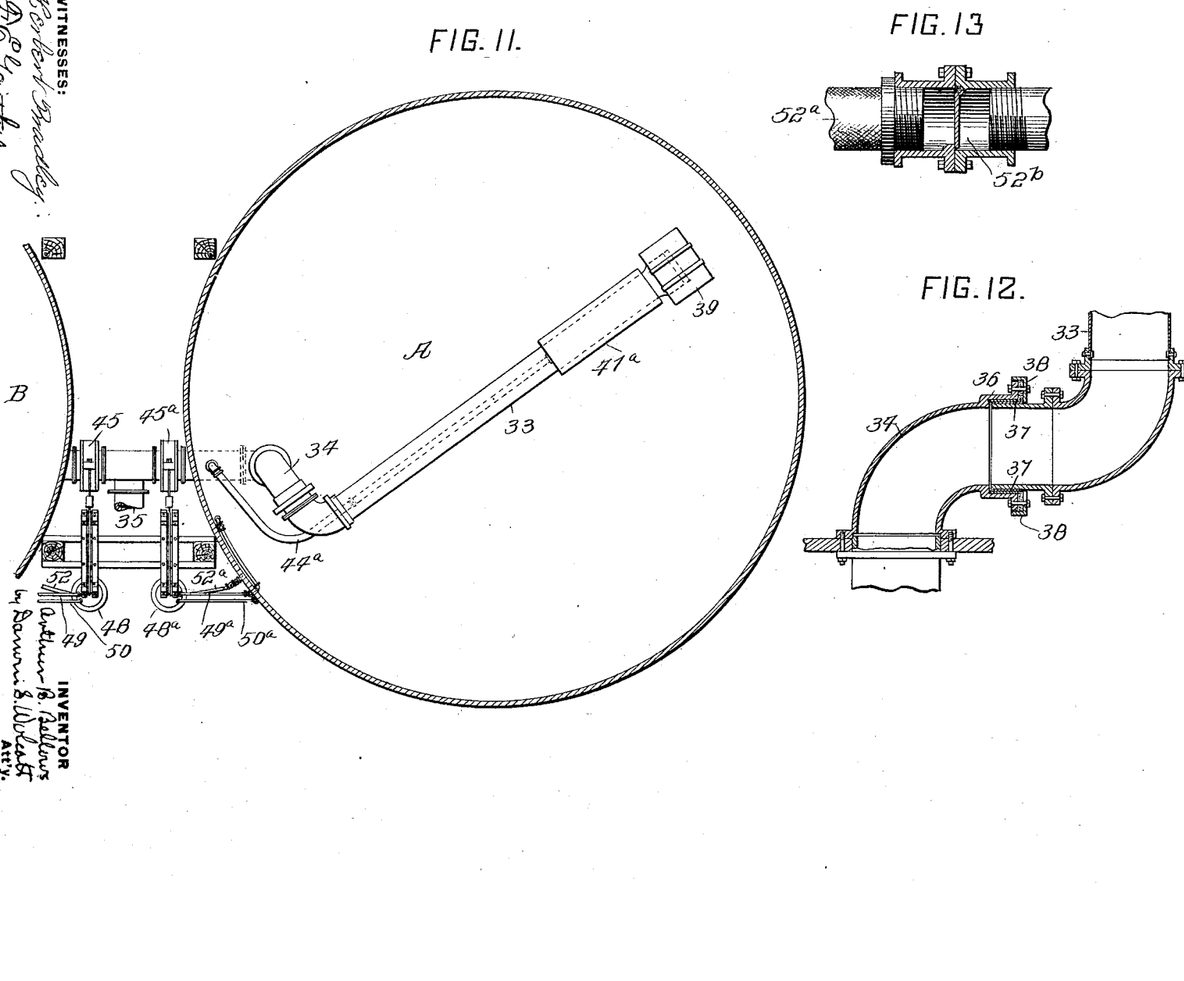
Fig. 11 is a top plan view of the mechanism shown in Fig. 9.
Fig. 12 is a detail view, on an enlarged scale, of the flexible joint of the discharge-pipe.
Fig. 13 is a detail view of the check-valve.

Pipes 33 33ª, having their upper ends open, have their lower ends rotatably connected to branch pipes 34 34ª, passing out of the tank, preferably through the bottom, and connected to the main pipe 35, as shown in Figs. 9, 10, 11, and 12. A suitable construction of rotatable joint is shown in Fig. 12, and consists in forming bell 36 on the end of the pipe 34 for the reception of the end of the pipe 33. A rib 37 is formed on or secured to the pipe 33, and the latter is held in position by a ring 38, bearing against said rib and drawn toward the bell 36 by bolts passing through the ring and a flange on the bell. The free end of the pipe is supported by a float 39 with its mouth a little below the level of the water, except when the water-level approaches the bottom of the tank, at which time the end of the pipe is supported by a block 40. This block is made sufficiently high to prevent the end of the pipe dropping down into the sludge which collects on the bottom of the tank. It will be readily understood that the float 39 will not raise the pipe from the block until the level of the water has risen above the open end of the pipe, and hence provision should be made for raising the free end of the pipe as the tank is filled, so that the sludge which becomes stirred and mixed with the inflowing water cannot enter the pipe. To this end a shell 41 is formed or secured to the under side of the pipe 33, said shell being of sufficient size to act as a float and raise the free end of the pipe as the water enters and maintain it above the level of the rising water until the upward movement of the pipe is checked by the chain 42 or other suitable means. As the water continues to rise after the movement of the pipe is checked, the pipe will be filled and water will flow through the port 43 into the shell, destroying the buoyant power thereof, so that the pipe will drop until caught by the float 39 and again raised until checked by the chain 42. This shell will remain full until the pipe again rests on the block 40 and the water in the pipe 34 drops below the level of the shell, when the water therein will be siphoned out through the pipe 44, which has one end connected to the lowest point of the shell and the opposite end to the pipe 34 at a point below the bottom of the tank, as shown in Fig. 9. As soon as the shell is emptied it will again act as a float to keep the free end of the pipe above the level of the inflowing water.

While the valve 45 in the pipe 34 might be operated by an attendant after the water has stood in the tank a sufficient time, as hereinbefore stated, it is preferred to employ means which will act automatically at the proper time to open the valve and close it after the tank has been emptied. A desirable construction for that purpose is shown in Figs. 9, 10, and 11 and consists of a lever 46, pivoted at one end, as at 46ª, connected midway of its length to the valve, and so weighted as to drop down when free to move and close the valve. The free end of this lever is connected to one end of a rope or chain 47, which passes around guide-pulleys 47ª and has its opposite end connected to a closed shell or ball 48. Two pipes 49 and 50, which have their lower ends connected by sections of flexible hose to the shell, extend one to a point slightly below the level to which the tank is normally filled and the other to a point above such level. The pipe 49, which extends to a point below the normal water-level, passes into the tank, so that water may flow down into the shell, and is provided with a valve 51 to regulate the flow into the shell. The pipe 50 permits the escape of air from the shell as it is being filled. As water will not flow into the shell until the tank is filled, it will be seen that by the adjustment of the valve 51 the length of time the water is to be returned in the tank can be regulated as desired. As soon as the shell has become sufficiently filled or weighted it will drop down and raise the lever 46 and valve 45. In order to close the valve, the shell is connected by a flexible discharge-pipe 52 to the tank, the flow of water through said pipe being controlled by a valve 53. As soon as the water in the tank drops below the shell the water therein will flow out through the pipe 52, and by properly regulating the valve 53 the time at which the valve 45 should be closed can be fixed, as the weighted lever will drop and close the valve as soon as the shell is emptied. In order to prevent the ball or shell being filled through the pipe 52, the latter is provided with a check-valve 52ª, which will prevent water flowing into the tank through the pipe, but will not interfere with the outflow.

It will be understood that the tank B has a discharge mechanism similar to that described in connection with the tank A and that as the tanks are filled alternately the discharging thereof will alternate, as the operation of the discharge mechanism is dependent on the filling of the tanks.

Figure 14:
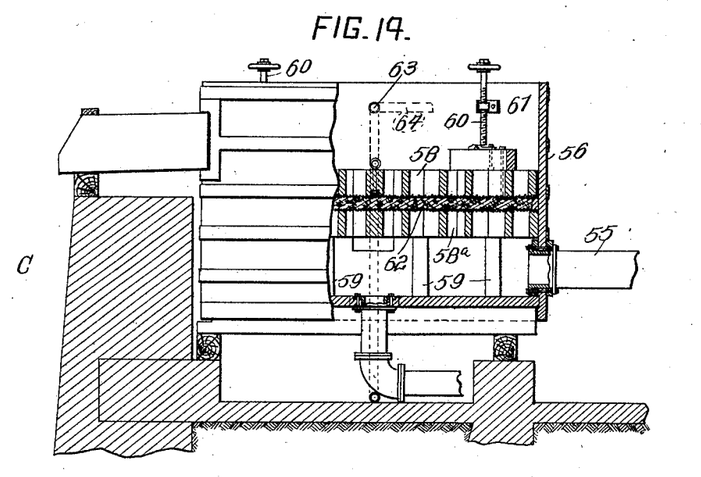
Fig. 14 is a view, partly in section and partly in elevation, of one of the filters.
Figure 15:
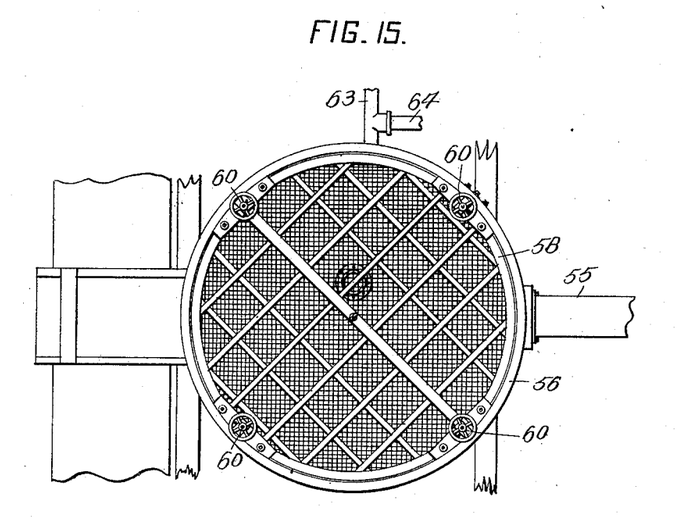
Fig. 15 is a top plan view of the same.

The branch pipes 34 34ª connect with a pipe 35, which is connected by branch pipes 55 55ª, &c., with a series of filtering-vats 56 56ª, &c. Valves 57 57ª, &c., are arranged in said branch pipes for controlling the flow of water to the vats. While many forms or constructions of filters may be employed in my improved plant, it is preferred to use sponge for that purpose. The sponge is supported or held in position by gratings 58 58ª. One of these gratings, as 58ª, is supported a suitable distance above the bottom of the vat by blocks 59, as shown in Fig. 14, while the frame or grating 58 is attached by swivel-joints to the lower ends of screws 60, which pass through the threaded sleeves 61, secured to the sides of the vat. A body of sponge 62 is arranged between the gratings or frames and is preferably compressed while water is flowing therethrough. In order to prevent the sponge from being squeezed into the recesses in the gratings, sheets of fine-wire netting or finely-perforated sheets are interposed between the gratings and the sponge. When it is desired to clean the sponge, the valve in the pipe 55, leading to the vat which is to be cleaned, is closed and the screws 60 turned to raise the upper grating and permit the body of sponge 62 to expand or open up, and water is allowed to flow or is forced into the vat above the gratings through the pipe 63, connected to the supply-pipe 1. This water flowing in the direction opposite that of the water being filtered will wash out any impurities caught by the sponge. The cleansing action of the water is assisted by screwing the upper grating up and down, thereby compressing the sponge and allowing it to open. This operation is similar to the hand manipulation of a piece of sponge when it is being cleaned. The cleaning of the sponge may be further facilitated by adding to the cleaning-water some substance which will render the impurities caught by the sponge soluble—as, for example, if the impurities consist of lime, magnesia, &c., the addition of carbonic acid to the cleaning-water renders the latter a solvent of such substances. The carbonic acid can be introduced into the water by a pipe 64, extending from a suitable generator to the pipe 63, as shown in Figs. 1 and 13.

Figure 16:
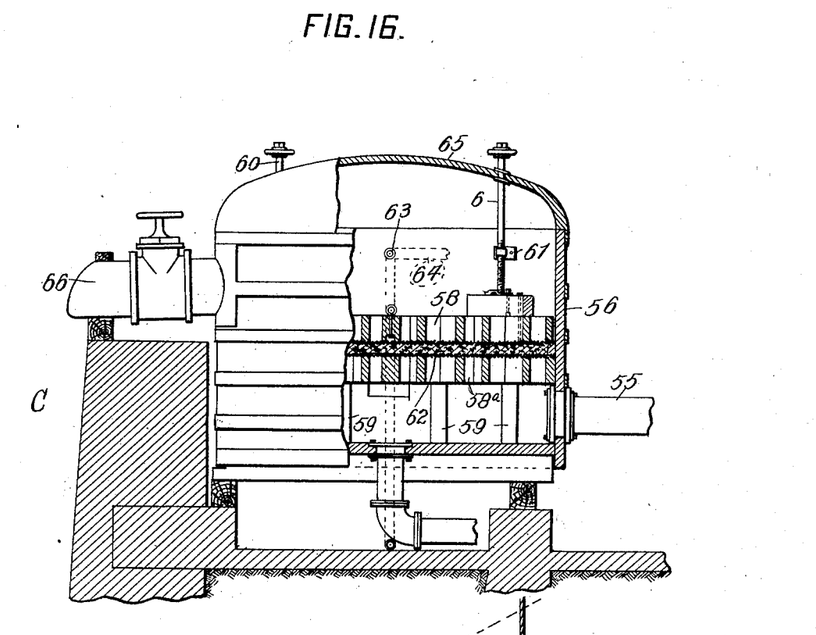
Fig. 16 is a sectional elevation illustrating a modification of the filter.

As shown in Fig. 16, a tight cover 65 may be secured over the vats, so that the cleaning of the sponge may be effected under pressure. When using the cover, the stems of the screws 60 are passed through suitable stuffing-boxes on the cover, and pipes 66, having valves, are substituted for the open spouts or troughs for conducting the filtered water to the reservoir C.

It will be observed that a system of pipes is arranged under the several tanks and vats and that each tank or vat has a valved connection with this system, such connection being made with the lowest point of the tank or vat, so that all sludge, &c., may be drained into the sewer system. By reference to Fig. 1 it will be seen that the distributing-arms 8 are so arranged as to surround or hedge in certain portions of the lower parts of the tanks 7 $7^a$ and that the sewer system is connected to said tanks within the spaces inclosed by said arms. It follows by reason of such arrangement that when the valves in the sewer-pipes are opened and water forced through these branches or arms the sludge or sediment will be forced toward the sewer-openings. It has heretofore been stated that the discharge-perforations are formed in the under side of the arms or branches 8, so that the jets of water issuing from said perforations will strike the bottoms of the tanks at an acute angle. By means of this construction it follows that the jets of water will act only on the portions of sludge or sediment on or closely adjacent to the bottom and that the overlying portions of the contents of the tanks will not be materially disturbed beyond that incident to a gradual sinking down as the lowest parts are driven out.

When using the double system of tanks, as shown in Fig. 1, the fractional stream from the dividing-trough 2 is directed first into one take-up tank, as 7, which has been charged with the treating material, until the treating material needs renewal. The valve 18 is then closed and the valve $18^a$ opened, so as to direct the fractional stream into the take-up tank $7^a$, which has been previously charged with the treating material. After the valve 18 has been closed the valve of the sewer system controlling the discharge from tank 7 is opened and water is forced through the arms 8 to drive the sludge on the bottom of the tank into the sewer. While the water for this purpose could be obtained by partially opening the valve 18, it is preferred to connect the branches 8 to the supply-pipe 1 by pipes 67 $67^a$, having a controlling-valve 68 $68^a$. By thus taking water for cleaning purposes from the pipe 1 the proportions between the streams into which the water has been divided by the trough 2 will not be disturbed. After the tank 7 has been cleaned an additional quantity of cream of lime is added and sufficient water is admitted through the pipe 67 to fill the tank up to or approximately to the level of the outlet-pipe 19, so that as soon as the fractional stream is again directed into the tank there will be a flow of saturated solution of lime-water out through the pipe 19. By opening the valve 18, and vice versa, before closing the valve $18^a$ there will be an uninterrupted flow of water through the pipe 19 to the mixing and distributing tanks.

It is well understood that the carbonates of lime, magnesia, &c., present in hard waters are not separable from the water as long as carbonic acid is also present. It is also known that by the addition of lime in suitable proportions to such water the carbonic acid will be eliminated and the carbonates of lime and magnesia be transformed to an insoluble precipitate. It is also known that certain hard waters containing sulfate of lime require for their purification soda-ash or carbonate of soda, which transforms the lime into the carbonate, which separates as an insoluble precipitate. The purification by lime and by soda may proceed simultaneously.

In the practice of my invention the water is divided into two or more streams or bodies of such relative volumes that one stream freed from carbonic acid and its carbonates of lime and magnesia precipitated and after purification transformed into a saturated solution of lime-water will contain sufficient lime to eliminate the carbonic acid contained in the other stream or body and precipitate all carbonates of lime and magnesia contained in the two bodies when united. After the water has been thus divided one carrying or purifying stream is caused to pass through a body of cream of lime. In passing through the cream of lime the carbonic acid is first elimited from the stream and the carbonates of lime and magnesia precipitated. The purified or softened water then takes up enough lime to form a saturated solution. A second stream, if desired, passes through an excess of soda-ash and becomes saturated. These saturated solutions are then one or both thoroughly mixed with the main stream or body. The body of water formed by the union of these streams or bodies will contain the necessary elements under proper conditions to transform all the carbonates and sulfates of lime and magnesia contained therein into insoluble precipitates which can be mechanically removed from the water, leaving the latter pure and soft.

While the purification of the purifying or carrying streams is described as consisting of a series of steps or chemical and mechanical actions, it is probable that the rendering of the lime, magnesia, &c., insoluble and the formation of the saturated solutions occur nearly simultaneously. The order in which the several reactions occur is immaterial.

While flowing through the mixing and distributing trough the united streams should be so agitated by any suitable means—such, for example, as those shown and described—as to insure a complete and thorough intermingling of the hard water and the purifying solution or solutions, and, further, it is preferred that the trough should be made sufficiently long that the chemical action of forming the insoluble precipitates should be as nearly as possible completed while the water is passing through the trough.

While the invention has been described as applied to the purification of water containing lime, magnesia, &c., it will be understood that this method can be employed for eliminating other impurities from fluids by placing in the take-up tanks a material which will so transform the impurities that they can be easily separated from the fluid, and hence the invention herein is not limited to the elimination from fluids of any particular kind of impurities or undesirable elements. It is known that in this, as in other chemical reactions where a crystalline precipitate is formed, the completion of the precipitation is hastened by the presence of previously-formed precipitate. To this end some of the precipitate or sludge is allowed to remain in the settling-tank, so that it can be thoroughly intermingled with the treated liquid. The agitation of the sludge or precipitate, which effects the desired intermingling thereof with the treated water, may be effected in any desired manner; but generally the inflowing stream of treated water will effect sufficient agitation for this purpose. In lieu of or in addition to mixing the precipitate with the treated water in the settling-tanks a suitable quantity of the sludge or precipitate may be fed into the mixing-trough or baffle-channel 21 by suitable means, such as a pump 69, which is connected by pipes 70 to the bottoms of the settling-tanks and by a pipe 71 to the mixing-trough, as shown in Fig. 1.

It will be observed that the fractional stream, which is employed for carrying the lime to the main body of water, is caused to pass upward through the cream of lime. This method of operation is of especial importance, as thereby the fractional stream is treated and freed from its impurities in the lower portions of the take-up tanks and becomes saturated in the upper portions of the tanks. In this way the impurities will not become materially intermingled with the cream of lime, and the stream flowing into the mixing or baffle channel will be almost wholly free from impurities, and, further, by employing cream of lime the lime is presented to the water to be treated in a finely-divided state, thereby facilitating its absorption by the inflow-streams, which by reason of their direction of flow through the tanks prevent the gravity separation of the elements forming the cream of lime.

I claim herein as my invention—

1. In a plant for the treatment of water, the combination of means for dividing a stream of water into two or more fractional streams, a tank containing a supersaturated solution of the treating material, a pipe for delivering one of the fractional streams into the lower end of said tank, a mixing or baffle trough or channel connected to the upper portion of said tank and a pipe for conducting the other fractional stream to trough or channel, substantially as set forth.

2. In a plant for the treatment of water, the combination of a box or trough connected to a supply-pipe and provided with two or more outlets, weir-plates for effecting a proportional division of the inflowing stream interposed between the supply-pipe and the outlets, a mixing or baffle trough or channel connected to the outlets from the dividing-box and a take-up tank interposed between one of the outlets of the dividing-box and the mixing trough or channel, substantially as set forth.

3. In a plant for the treatment of water, the combination of means for dividing a stream of water into two or more fractional streams, a tank containing a supersaturated solution of the treating material, distributing-pipes having perforations in their under sides, arranged near the bottom of the tank, a pipe for conducting one of the fractional streams to the distributing-pipes, a mixing or baffle trough or channel connected to the upper portion of the tank and a pipe for conducting the other fractional stream to the trough or channel, substantially as set forth.

4. In a plant for the treatment of water, a saturating or "take-up tank" having discharge-outlets in its bottom and a series of pipes having perforations arranged in their under sides to direct streams of water at an acute angle onto the bottom of the tank, arranged around the outlets and connected to a supply-pipe, whereby the sediment in the tank can be driven toward the outlets, substantially as set forth.

5. In a plant for the treatment of water, the combination of means for dividing a stream of water into two or more fractional streams, a tank containing the treating material arranged to receive one of said streams, a trough or channel connected to said tank and adapted to receive the other stream, a series of baffle-plates arranged transversely of the trough or channel, two settling-tanks, arranged to receive the water from the mixing trough or channel, valves controlling the flow of water to the tanks and means operated by the water flowing into the tanks for opening and closing said valves, substantially as set forth.

6. In a plant for the treatment of water, a settling-tank having a valved discharge-pipe and means operative automatically at a predetermined time after the filling and emptying of the tank to open and close the discharge-valve, substantially as set forth.

7. In a plant for treating water, the combination of a tank, a pivotally-mounted discharge-pipe, a float connected to the pipe, an auxiliary float carried by said pipe and connected to the pipe, and a siphoning-pipe connected to the auxiliary float, substantially as set forth.

8. In a plant for treating water, the combination of a tank having a valved outlet, a bucket or shell connected to the valve and having flexible tubular connections to the tank near its upper and lower ends, and valves controlling the flow of water to and from the buckets, substantially as set forth.

9. In a plant for treating water, the combination of a mixing trough or channel, a settling-tank arranged to receive the treated water from the trough or channel and means for adding sludge or previously-formed precipitate to the water as it flows through the mixing trough or channel, substantially as set forth.

In testimony whereof I have hereunto set my hand.

ARTHUR B. BELLOWS.

Witnesses:
 DARWIN S. WOLCOTT,
 F. E. GAITHER.